(12) United States Patent
Kahn et al.

(10) Patent No.: US 7,924,456 B1
(45) Date of Patent: Apr. 12, 2011

(54) DATA DISTRIBUTION AND BUFFERING

(75) Inventors: Michael A. Kahn, Hudson, MA (US); Matthew G. Sargeant, Westford, MA (US); Francis J. Stifter, Jr., Hampton Falls, NH (US)

(73) Assignee: Broadbus Technologies, Inc., Boxborough, MA (US)

( * ) Notice: Subject to any disclaimer, the term of this patent is extended or adjusted under 35 U.S.C. 154(b) by 993 days.

(21) Appl. No.: 11/652,924

(22) Filed: Jan. 12, 2007

(51) Int. Cl.
*G06F 15/00* (2006.01)
*H04N 7/173* (2006.01)

(52) U.S. Cl. .................................. 358/1.16; 725/93
(58) Field of Classification Search ................ 358/1.16, 358/1.15, 1.14, 1.13, 473, 474, 296, 1.9; 709/203, 217, 225; 710/62, 52, 107, 22; 400/62, 76; 725/32, 93; 375/240.26; 386/46, 386/125
See application file for complete search history.

(56) References Cited

U.S. PATENT DOCUMENTS

| 6,134,585 | A * | 10/2000 | Yamato |
| 7,096,481 | B1 | 8/2006 | Forecast et al. |
| 2003/0095783 | A1 | 5/2003 | Binder et al. |

FOREIGN PATENT DOCUMENTS

| JP | 10-293738 | 11/1998 |
| JP | 2004-72686 | 3/2004 |

OTHER PUBLICATIONS

Office Action, Korean App. No. 10-2008-4096 (English Translation), Feb. 17, 2010.
Office Action, Korean App. No. 10-2008-4096 (Foreign Text), Jan. 27, 2010.
Office Action, Chinese App. No. 200810002668.4 (English & Foreign Text), Oct. 9, 2009.
Office Action, Korean App. No. 10-2008-0004096 (Foreign Text), Jul. 31, 2009.
Office Action, Korean App. No. 10-2008-0004096 (English Translation), Aug. 14, 2009.

* cited by examiner

*Primary Examiner* — Saeid Ebrahimi Dehkordy
(74) *Attorney, Agent, or Firm* — Stewart M. Wiener

(57) ABSTRACT

An on-demand server system herein includes a memory controller that coordinates access to one or more flash-based memory devices. The flash devices store large amounts of video content that can be selectively viewed on-demand by each of multiple destinations over a respective network. In addition to having access to an array of flash memory devices, the memory controller has access to a corresponding read buffer and write buffer. Use of the read buffer and the write buffer enable the memory controller to switch between transferring data stored in the write buffer to the array of memory devices and transferring the data in the array of memory devices to the read buffer. The write buffer stores on-demand video content that can be selected for viewing by different users. The read buffer stores segments of the on-demand video content currently streamed to the users.

19 Claims, 7 Drawing Sheets

DATA DISTRIBUTION AND BUFFERING

BACKGROUND

Conventional technology has made it possible to more quickly and efficiently convey information to subscribers of an on-demand cable network. For example, in the cable network space, digital cable now offers a multitude of channels to subscribers for receiving different types of streamed data content for on-demand playback on a respective television.

According to conventional cable technology, respective subscribers sometimes have so-called set top box devices in their homes that receive encoded digital information transmitted from a server managed by a corresponding cable company. Upon receipt of the encoded digital information, a respective set top box performs a decoding function for playback purposes. Once decoded, a respective set top box in a viewer's home drives a corresponding television system with an appropriate "rasterized" signal of decoded data derived from the selected channel. Accordingly, a television viewer is able to view a corresponding television program transmitted by the cable company and received by a corresponding set top box.

Typically, the corresponding cable company maintains or has access to a library of information that can be distributed to corresponding target set top boxes. Accordingly, a subscriber can select an item from the library for viewing in a home environment.

SUMMARY

One solution for serving content from a respective server managed by a cable company involves temporary storage of content in one or more RAM (e.g., Random Access Memory) type storage devices. When so used, content such as an entire movie may be stored in RAM for distribution to one or more subscribers initiating on-demand viewing of the movie.

One deficiency associated with conventional use of memory (e.g., RAM) to temporarily store an entirety of content (e.g., a number of movies from start to finish) for distribution to respective subscribers as discussed above is the cost associated with RAM-based storage devices. For example, consider that a server configured to distribute large amounts of content (e.g., many different movies) would require an enormous amount of RAM-based storage devices to have the ability to serve many different types of movies to many different subscribers.

A possible alternative to use of RAM-based storage is to store the content in a disk-based storage device. This solution is unacceptable because serving (e.g., streaming) content from a disk-based storage device may be slow and therefore not provide a true on-demand experience in which each of multiple users can control receipt of content from a remote server.

The following disclosure includes several useful embodiments for processing and distributing content. For example, one embodiment herein includes enabling a relatively high bandwidth interface to quickly (relative to disks) retrieve data from one or more flash devices via a portion of a respective data processing system that implements long bursts of data while another portion of the data processing system manages shorter bursts of data.

For example, according to a general embodiment that will be discussed in more detail below, a system herein includes a memory controller that coordinates access to one or more flash-based memory devices. In such an embodiment, the memory controller has a corresponding read buffer and write buffer in addition to an array of flash memory devices. Use of the read buffer and the write buffer enables the memory controller to switch between transferring data stored in the write buffer to the array of memory devices and transferring the data in the array of memory devices to the read buffer.

In a specific embodiment, the data stored in the write buffer is video content such as a movie being stored in the array of memory devices for on-demand distribution to subscribers. The read buffer can be configured to include one or more RAM-based memory devices that store segments of data (e.g., a portion of video content) retrieved from the array of memory devices. Thus, instead of directly distributing the data from the array of memory devices, the memory controller distributes the video content as streaming data from the read buffer (e.g., a cache). Upon receiving a command to provide a section of video content currently not in the read buffer, the memory controller initiates an access to the array of flash memory devices for a following segment. The memory controller repeats this process of streaming content from the read buffer and updating contents of the read buffer until the respective server distributes the requested content in its entirety or a respective subscriber issues a command to stop streaming of the corresponding content.

In one embodiment, the content includes embedded pointers for navigation purposes. For example, the pointers in the content stored in the write buffer, array of flash memory devices, and read buffer point forwards and backwards to different locations in the content. Users viewing streamed video content can issue commands from the respective set top box such as play, fast forward, pause, rewind, etc. A processor managing streaming of the video content at a respective server navigates about and distributes different portions of the content in accordance with the issued commands based on use of the navigation pointers associated with the streamed content. In other words, a process at the server uses different navigation pointers to stream different portions of the content based on receipt of user commands.

Techniques herein are well suited for use in applications such as those that generate and distribute navigable data streams such as live or pre-recorded data streams to multiple subscribers on demand. However, it should be noted that configurations herein are not limited to use in such applications and thus configurations herein and deviations thereof are well suited for other applications as well.

In addition to potentially being implemented via discrete hardware components such as logic, buffers, registers, etc., other embodiments herein can include a hardware platform such as a computerized device (e.g., a computer processor system, a host computer, personal computer, workstation, etc.) that is configured to support the aforementioned techniques of managing storage and distribution of content. In such embodiments, the computerized device includes a memory system, a processor (e.g., a processing device), and a respective interconnect. The interconnect couples the processor to the memory system. The memory system is encoded with an application (e.g., software code) that, when executed on the processor, enables management and distribution of content.

Yet other embodiments of the present application disclosed herein includes software programs to perform the method embodiment and operations summarized above and disclosed in detail below. More particularly, embodiments herein include a computer program product (e.g., a computer-readable medium) including computer program logic encoded thereon may be executed on a computerized device to manage storage and distribution of content as explained herein. The computer program logic, when executed on at least one processor with a computing system, causes the processor to perform the operations (e.g., the methods) indicated herein as embodiments of the present disclosure. Such arrangements as further disclosed herein are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or an Field Programmable Gate Array (FPGA) or as downloadable software images in one or more modules, shared libraries, etc. The software or firmware or other such configurations can be installed onto a computerized device to cause one or more processors in the computerized device to perform the techniques explained herein.

One more particular embodiment of the present application is directed to a computer program product that includes a computer readable medium having instructions stored thereon for supporting content management and distribution according to embodiments herein. The instructions, when carried out by a processor of a respective computer device, cause the processor to perform the steps of: i) receiving a request for a particular portion of a content stream; ii) in response to receiving the request, initiating an access of a block of data from an array of flash memory devices, the block of data including the particular portion of the content stream as well as corresponding contiguous portions of the content stream; iii) storing at least a portion of the accessed block of data in a (RAM-based) read buffer for on-demand streaming to a respective destination; and iv) initiating transmission of the particular portion of the content stream to the respective destination. Other embodiments of the present disclosure include software programs and/or hardware to perform any of the method embodiment steps and operations summarized above and disclosed in detail below.

Note that this summary does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure.

BRIEF DESCRIPTION OF THE DRAWINGS

The foregoing and other objects, features and advantages of the present application will be apparent from the following more particular description of preferred embodiments, as illustrated in the accompanying drawings in which like reference characters refer to the same parts throughout the different views. The drawings are not necessarily to scale, with emphasis instead being placed upon illustrating example embodiments, principles and concepts.

DETAILED DESCRIPTION

The following disclosure includes several useful embodiments supporting efficient use of flash memory and RAM-based storage devices. For example, an on-demand server system herein includes a memory controller that coordinates access to one or more flash-based memory devices. The flash devices store large amounts of content (e.g., video content including embedded sets of pointer information) that can be selectively viewed on-demand by each of multiple destinations over a respective network.

In addition to having access to an array of flash memory devices, the memory controller has access to a corresponding read buffer and write buffer. The read buffer is capable of storing large amounts of data read out of the flash devices, when only a small amount of data in the flash devices is requested by a corresponding user. The way to high obtain high flash read performance according to embodiments herein is to initiate large burst reads. When streaming data, a corresponding processing engine accesses the flash device and utilizes utilizing a small amount of data at any given time. Within a particular stream, read accesses can be linearly addressed. Thus, if the remainder of an initial large burst is stored in a higher bandwidth read buffer, then the highest possible flash throughput can be realized. The system can include a write buffer for similar reasons, but also to facilitate read/write interleaving as further described herein.

A cache according to embodiments herein caches data such as streaming data forwarded to requesting users. In one embodiment, the write buffer stores on-demand video content that can be selected for viewing by different users. The read buffer stores segments of the on-demand video content currently streamed to the users.

Figure 1:
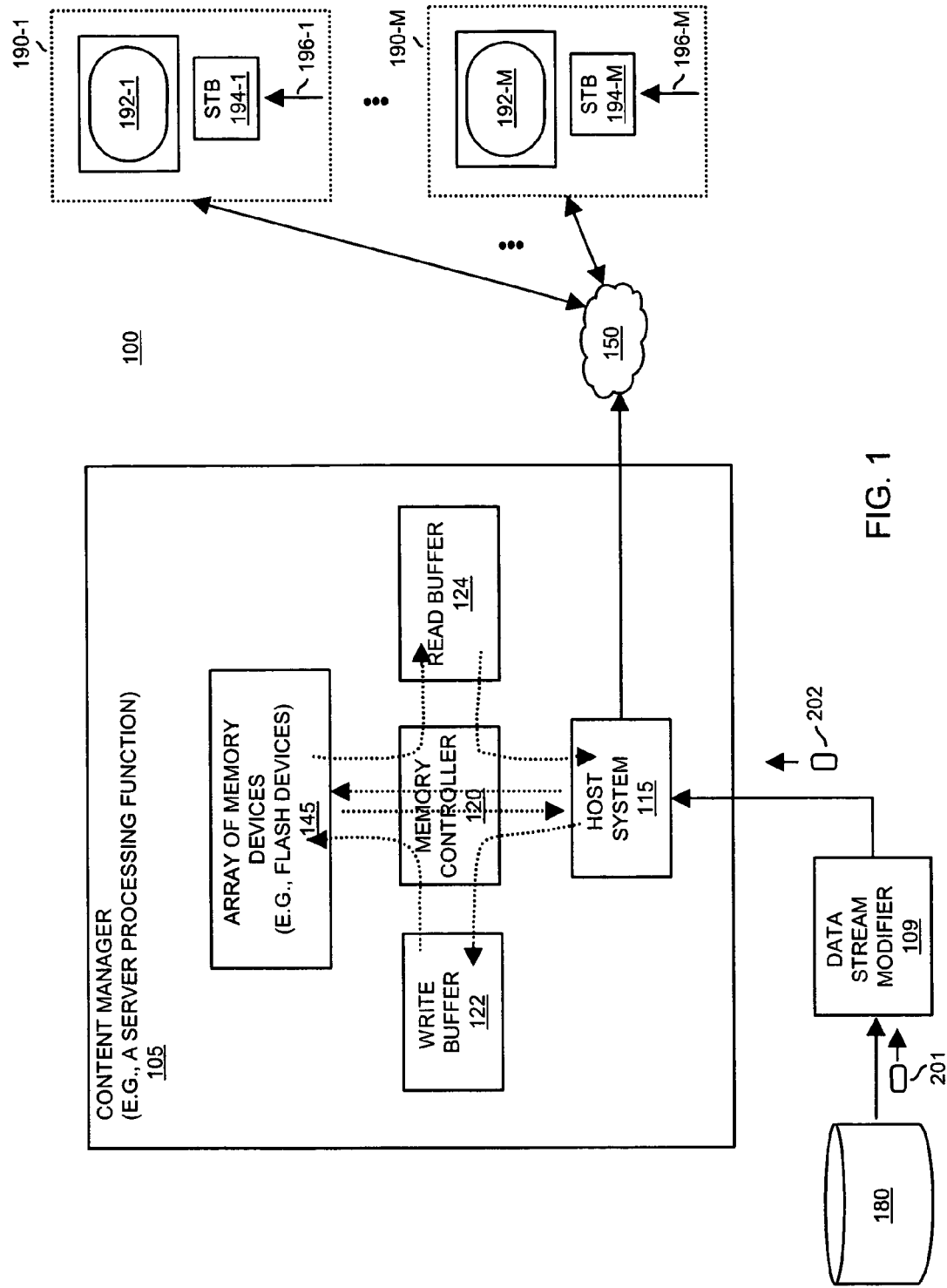
FIG. 1 is a diagram of an example content manager according to embodiments herein.

FIG. 1 is a diagram depicting an example of communication system 100 according to embodiments herein. In the context of the present example, communication system 100 (e.g., a content repository and data streaming system) includes content manager 105, network 150 (e.g., a public or private network), repository 180, data stream modifier 109, and multiple user domains 190 (e.g., home environments such as user domain 190-1, . . . , user domain 190-M) for viewing video information, listening to audio information, etc.

In the embodiment as shown, content manager 105 includes a host system 115, memory controller 120, write buffer 122, read buffer 124, and memory devices 145. Each of the user domains 190 (e.g., subscriber environments such as a person's home) includes a respective media player 192 (e.g., media player 192-1 . . . media player 192-M such as a television, computer system, audio system, etc.) and set top box 194 (e.g., set top box 194-1, . . . , set top box 194-M). Content manager 105 resides at a remote server location with respect to the user domains 190.

According to one implementation, a respective user (e.g., subscriber) associated with a user domain 190-1 provides one or more input signals 196-1 (e.g., navigation control signals generated by a device such as a handheld wireless remote control device operated by the subscriber) to a respective set top box 194-1 for purposes of controlling streaming of content (e.g., video and/or audio information) to be played back by a respective media player 192-1 (e.g., television, video player, music player, etc.). In such an implementation, a respective set top box 194-1 communicates input control signals 196-1 received from the respective subscribers over network 150 to host system 115 that at least in part manages serving of appropriate data to the user domains 190.

Based on commands (e.g., start, stop, fast forward, rewind, etc.) received from a respective user domain 190 over network 150 for a given content stream, the host system 115 of content manager 105 communicates with memory controller 120. For example, the host system 115 can communicate a title (or other unique identifier) of the content to be streamed and/or a position of the corresponding content to be streamed to a respective set top box 194.

As previously discussed, memory controller 120 manages operations of extracting data from memory devices 145 for temporary storage of the streams in read buffer 124. The memory controller 120 forwards or enables the host system 115 to stream the appropriate content over network 150 to a respective subscriber viewing or recording the content stream. If the host system 115 attempts to retrieve a segment of data not found in the read buffer 124 (e.g., an access results in a cache miss), the memory controller 120 initiates an access to memory devices 145 to transfer the requested segment as well as other segments of the respective content stream into read buffer 124. In one embodiment, memory controller 120 can anticipate a need for new segments of a content stream for storage in read buffer 124 (based on detecting that the host system 115 streams data transmits data from an end of the range of content stored in the read buffer 124) so that the host system 115 can provide an uninterrupted viewing experience to a respective subscriber.

Accordingly, each home environment can include a relatively simple set top box 194 that enables a respective user to receive (e.g., streaming data) and transmit (e.g., input commands) over network 150 to content manager 105. As shown, the content manager 105 can be a server at centralized location that processes and distributes many asynchronous data streams to different destinations depending on user requests.

Prior to initiating streaming of content over network 150 to subscribers, the central manager 105 initiates storage of content in memory devices 145. For example, repository 180 can include a library of content such as a number of movies encoded according to an MPEG (Moving Pictures Expert Group) format. The content in repository 180 may or may not include sets of navigation pointers. If not, for each of multiple content streams (e.g., movies) forwarded to content manager 105, the data stream modifier 109 embeds sets of navigation pointers into the corresponding content segments as illustrated in FIG. 2.

Figure 2:
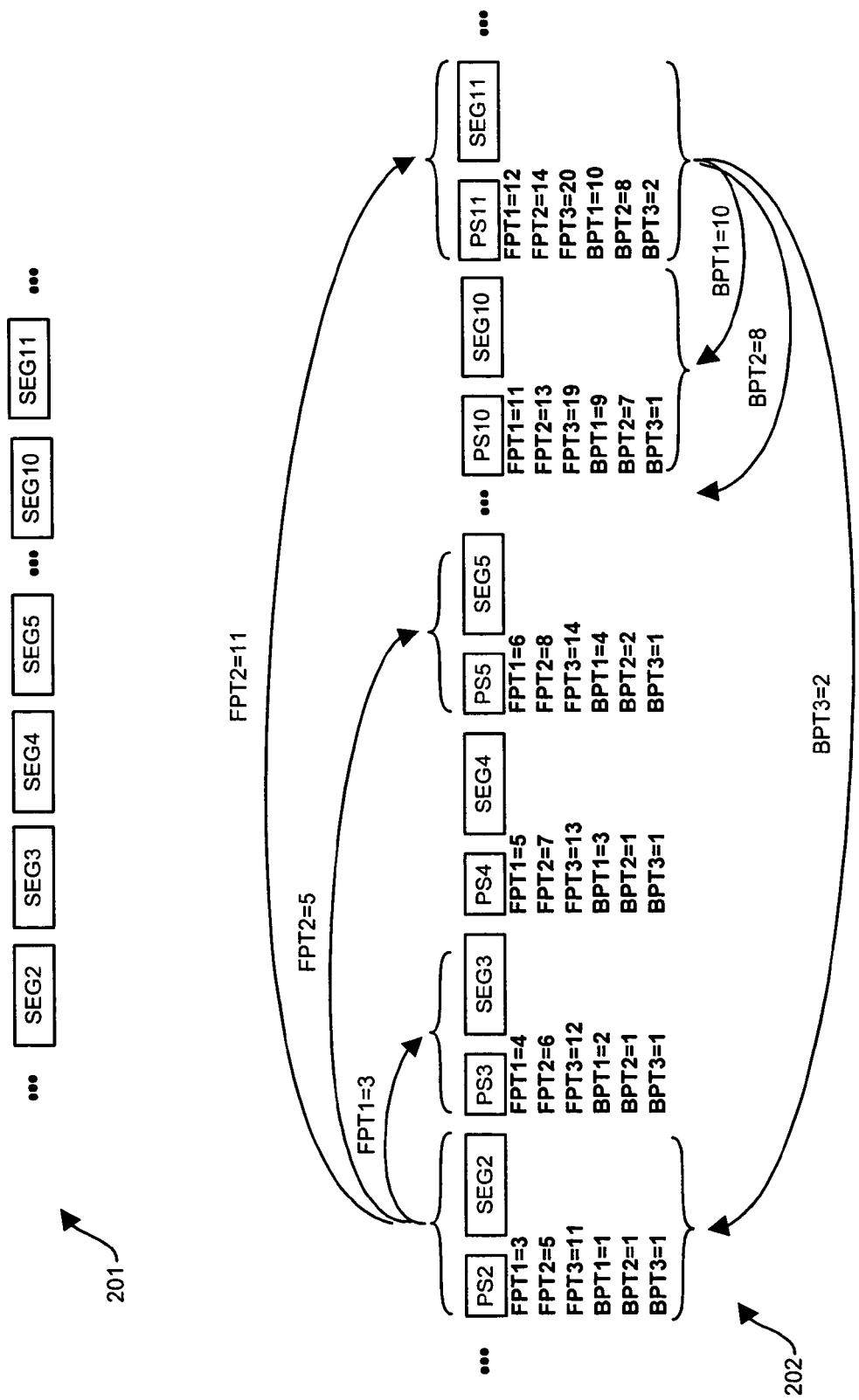
FIG. 2 is a diagram of an example data stream including multiple sets of pointers pointing to future and past segments according to embodiments herein.

More particularly, FIG. 2 is a diagram of sets of pointers inserted into a respective content stream 201 according to embodiments herein. The segments in a content stream can include one or more different types of MPEG frame information (e.g., I-frame, B-frames, P-frames, etc.). A segment can be one or more Groups Of Pictures (e.g., GOPs).

Metadata such as inserted sets of navigation pointers (e.g., PS1, PS2, etc.) can include forward pointers (e.g., FPT1, FPT2, FPT3, etc.) and backward pointers (e.g., BPT1, BPT2, BPT3, etc.). As an example, content stream 201 received from repository 180 can initially include SEG2, SEG3, SEG4, SEG5, and so on. Data stream modifier 109 produces content stream 202 to include forward and backward pointers to other locations of the content stream. Accordingly, upon receipt of different commands from a subscriber viewing the content stream (201 or 202) over network 150, the host system 115 is able to perform operations such as repeat transmission of a same segment of content (e.g., in response to receiving a pause command), stream segments of the content stream at a normal viewing rate (e.g., based on a play command), transmit future segments of a content stream (e.g., based on receiving a fast forward command), transmit earlier segments of the content stream (e.g., based on receiving a rewind command), and so on.

Thus, one purpose of the forward and backward pointers in content stream 202 is to enable a respective user to control which portion of a respective data stream stored in repository 180 to playback on a respective media player. For example, the inserted forward pointers (e.g., FPT1, FPT2, FPT3) and backward pointers (e.g., BPT1, BPT2, BPT3) enable the respective user to perform navigation such as fast forward and rewind functions at different rates. In other words, if the subscriber initiates a slow fast forward rate, the FPT1 between each segment provides a way to skip to the next contiguous frame in a respective content stream. FPT2 enables skipping over two segments to a following segment and thus provides a faster fast-forwarding rate. FPT3 enables skipping of a ten segments to a following segment and thus provides yet a faster fast-forwarding rate for the subscriber. In these latter cases for FPT2 and FPT3, the subscriber can view every third and tenth frame (e.g., segment) of content stream 202, respectively. Note that the backward pointers (e.g., BPT can be used to navigate backwards) in a respective content stream in a similar way.

Referring again to FIG. 1, the data stream modifier 109 provides the content stream 202 including the inserted set of navigation pointers to host system 115. Host system 115, in turn, initiates storage of the content stream 202 in write buffer 122. Upon detecting that a portion (e.g., one or more segments and corresponding pointers) of the content stream 202 stored in write buffer 122 exceeds a threshold value, the memory controller 120 initiates storing the portion of content stream 202 in write buffer to memory devices 145.

The threshold value for initiating a transfer can be based at least in part on a block size for writing to memory devices 145. For example, in one embodiment the content manger 105 can include an array of flash memory devices for storing the content stream 202 as well as other similar content streams. The array of memory devices 145 can require writing a specified number of bytes of data to memory. When the write buffer 122 includes more than the specified number of bytes of a particular content stream, the particular content can be transferred from the write buffer 122 to the memory devices 145.

The content stream 202 stored in memory devices 145 can be distributed to one or more subscribers. Assume in the context of the present example that a respective user at environment 190-1 generates input 196-1 (e.g., a command via a remote control device) to fast forward a current viewing point associated with content streamed from read buffer 124. Data stream manager 105 and more particularly host system 115 receives this command over network 150 and thereafter uses the forward pointers in a respective content stream (as received from read buffer 124) to jump ahead and stream data from a different location in data stream 140 over network 150 to the user as previously discussed. As mentioned, forward pointers FPT1 enable a first rate of fast forwarding, forward pointers FPT2 enable a second rate of fast forwarding, forward pointers FPT3 enable a third rate of fast forwarding, and so on. In one embodiment, network 150 represents a network such the Internet, a wide area network, a local area network, etc. Accordingly, the data stream manager 105-1 acts as a centralized location that manages streaming of data to multiple different locations such as environments 190.

Although host system 115 can receive content stream 202 from read buffer 124, the host system 115 can strip the navigation pointers from the content stream 202 and transmit only the original MPEG data information to the user. In such an embodiment, the host system 115 uses the navigation pointers as discussed above to stream appropriate content based on respective commands received from the subscribers.

Figure 3:
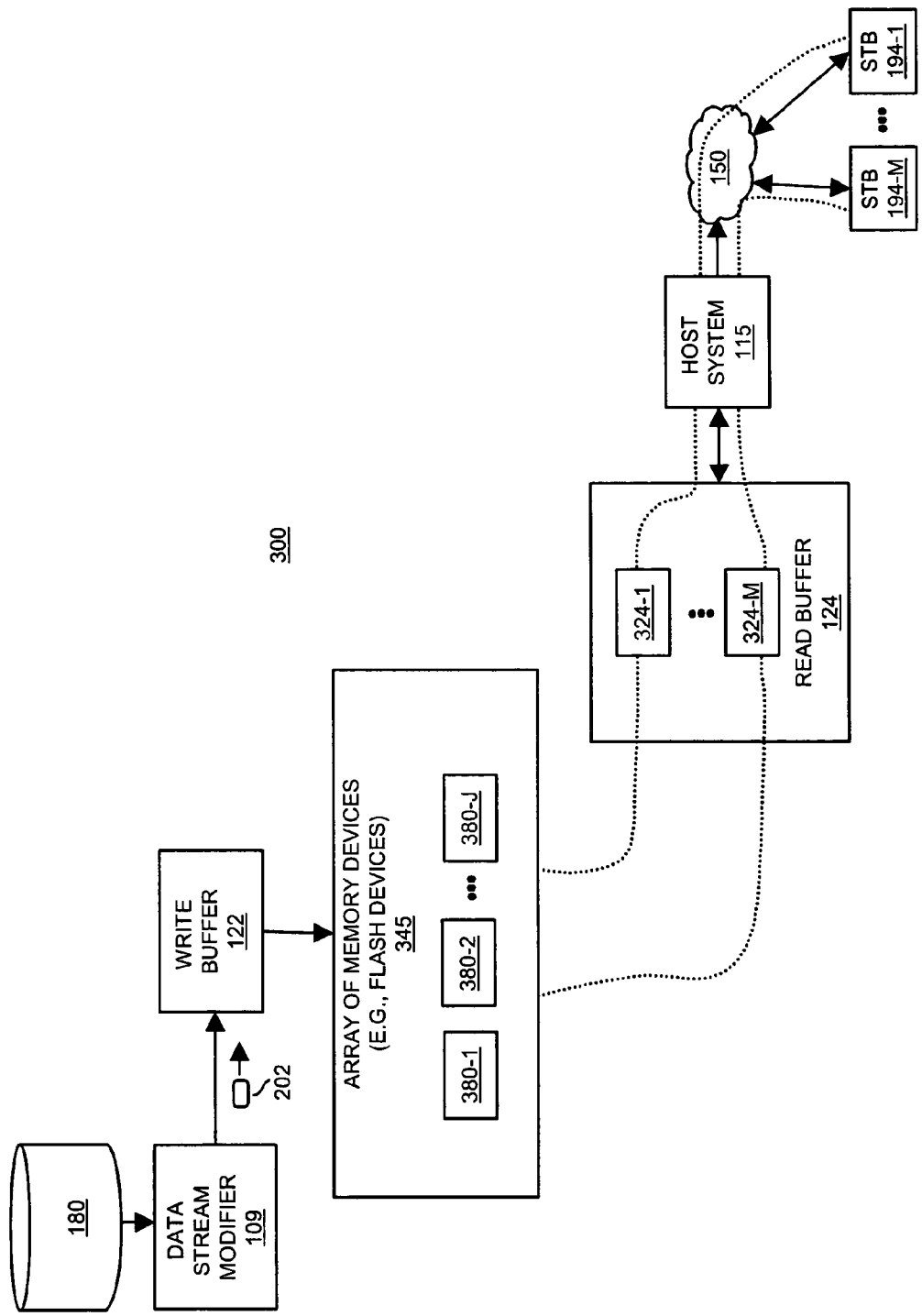
FIG. 3 is a diagram illustrating an example of buffering streaming content according to embodiments herein.

FIG. 3 is a diagram of an example content storage and distribution system according to embodiments herein. In this example embodiment, in accordance with the diagram of FIG. 1, memory controller 120 coordinates between transferring content from write buffer 122 to array of flash memory devices 345 and transferring content in array of flash memory devices 345 to read buffer 124 (e.g., a cache). As depicted in FIG. 3, read buffer 124 can be partitioned into multiple storage regions 324 (e.g., region 324-1, . . . , region 324-M) for storing portions of content (e.g., multiple segments as discussed above but not a whole movie) that are streamed through host system 115 over network 150 to respective subscribers. For example, region 324-1 of read buffer 124 can store content streamed to user domain 190-1, region 324-M of read buffer 124 can store content streamed to user domain 190-M, and so on.

Memory controller 120 transfers a next set of segments (either in a forward or reverse direction) stored in array of flash memory devices 345 into regions 324 after transmission of the earlier segments to the respective subscriber. In one embodiment, the host system 115 generates requests to update the regions 324 with new data as is necessary to support continuous streaming of data to subscribers. Alternatively, the memory controller 120 can monitor the current segment position of streaming data for a given region and update the regions in the read buffer 124 as necessary by transferring following segments of content stored in array of flash memory devices 345 into a corresponding region of read buffer 124.

Thus, embodiments herein support operations of: maintaining the array of flash memory devices 345 to store one or more logical groupings of video data capable of playback in a contiguous manner by a respective subscriber; allocating portions of the read buffer 124 (e.g., RAM-based storage) to store different corresponding segments of one or more logical groupings of video data for streaming to different respective destinations over network 150; and updating the regions 324 (e.g., portions of the RAM-based storage) to respective new segments of the one or more logical groupings of video data as the current segments in read buffer are streamed by host system 115 to respective destinations.

In one embodiment, distribution system 300 includes array of flash memory devices 345 (e.g., those based on NAND technology) including a flash memory device 380-1, flash memory device 380-2, . . . , flash memory device 380-J. The array of flash memory devices 345 can include sixty-four DIMMs (Dual In-Line Memory Modules). Each DIMM can have eight (32 Gigabyte) flash memory devices on it. The memory controller 120 stores content in array of flash memory devices 345 as striped data.

In general, the memory controller 120 accesses blocks of data (e.g., multiple bytes) from array of flash memory devices 345 instead of accessing single bytes. A block size can be specified two kilobytes (i.e., a page) of data from each flash memory device. Given that there are 512 flash memory devices (e.g., sixty-four times eight flash devices per each of multiple DIMMs) in array of flash memory devices 345, a single access from the array of flash memory devices 345 can include over one megabyte of data.

Transfer of such a large chunk of data from array of flash memory devices 345 to a region 324 in read buffer 124 would take a long time as well as require that read buffer 124 be very large in size, especially if read buffer 124 stores content for streaming to may different subscribers. To alleviate one or both of these problems, the memory controller 120 can truncate a respective access to fewer than a whole block. In other words, a read operation can be performed from a specified address of the array of flash memory devices 345 and prematurely truncated. This allows the memory subsystem array of flash memory devices 345 to simultaneously improve the granularity of the read data and reduce the time it takes to perform a read operation by not clocking out an entire page of data accessed from the array of flash memory devices 345. NAND-based flash memory devices support read truncation and can be used in one embodiment as described herein.

The memory controller 120 can initiate a respective block access and set a burst size for reading data from array of flash memory devices 345 to 25%. During a block read phase of a block access, after the data in the array of flash memory devices 345 is available (e.g., can be read from the memory devices' corresponding sense amplifiers), the memory controller 120 only accesses a portion (e.g., 25% in this example) of the available block of data. Thus, in the context of the present example, the memory controller 120 would not access two kilobytes of data available from each flash memory device in array of flash memory devices 345. Instead, the memory controller 120 would access and transfer only a quarter of the two kilobytes (e.g., 512 bytes) per flash device for transferring to the appropriate region in read buffer 124. Based on setting a burst size to 25%, the memory controller 120 transfers a quarter of the one megabyte (e.g., striped across 512 flash memory devices) available from the array of flash memory devices 345. Accordingly, embodiments herein can include: initiating a read of a data block from the array of flash memory devices 345; after the data block is available for retrieval from the array of memory devices, truncating the read to retrieve only a portion of the block of data in lieu of retrieving all of the block of data; and storing the retrieved portion of the block of data in a region 324 of the read buffer 124 allocated for the on-demand streaming of the portion of the block of data to the respective subscriber destination. The procedure described herein limits the throughput of the overall memory subsystem but allows the design to be practical. The tradeoff is between buffer size and overall throughput.

Writing of content to array of flash memory devices 345 can require erasing old data and thereafter writing new data to the array of flash memory devices 345. In between enabling transfers of data from the array of memory devices 345 to the read buffer 124 and transfers of data from the write buffer 122 to the array of flash memory devices 345, the memory controller 120 can enable a modification mode in which the data stored in the array of flash memory devices 345 can be modified. For example, the memory controller 120 can receive a new page of data to be stored at a specified location in the array of memory devices 345. In response to receiving the new page, the memory controller 120 retrieves a range of contiguous pages including a current page stored at the location in the array of memory devices to be overwritten with the new page. In a local buffer, the memory controller 120 replaces the current page in the retrieved range of multiple pages with the new page. The memory controller 120 initiates erasing the range of previously retrieved range of contiguous pages. After erasing, and while in the modification mode, the memory controller 120 initiates storage of the multiple retrieved pages with the exception of the page written to the specified location. In this example, the new page is written to the specified location rather than the old page.

Thus, embodiments herein support efficient modification of data in flash memory by writing several pages of data within a block of 64 pages without losing the other pages of data. For example, in accordance with the embodiments as discussed above, the memory controller 120 can read 64 pages into a buffer, erase the accessed 64 page block, and combine any new pages with the old pages for purposes of write the block back to the array of flash memory devices 345.

Figure 4:
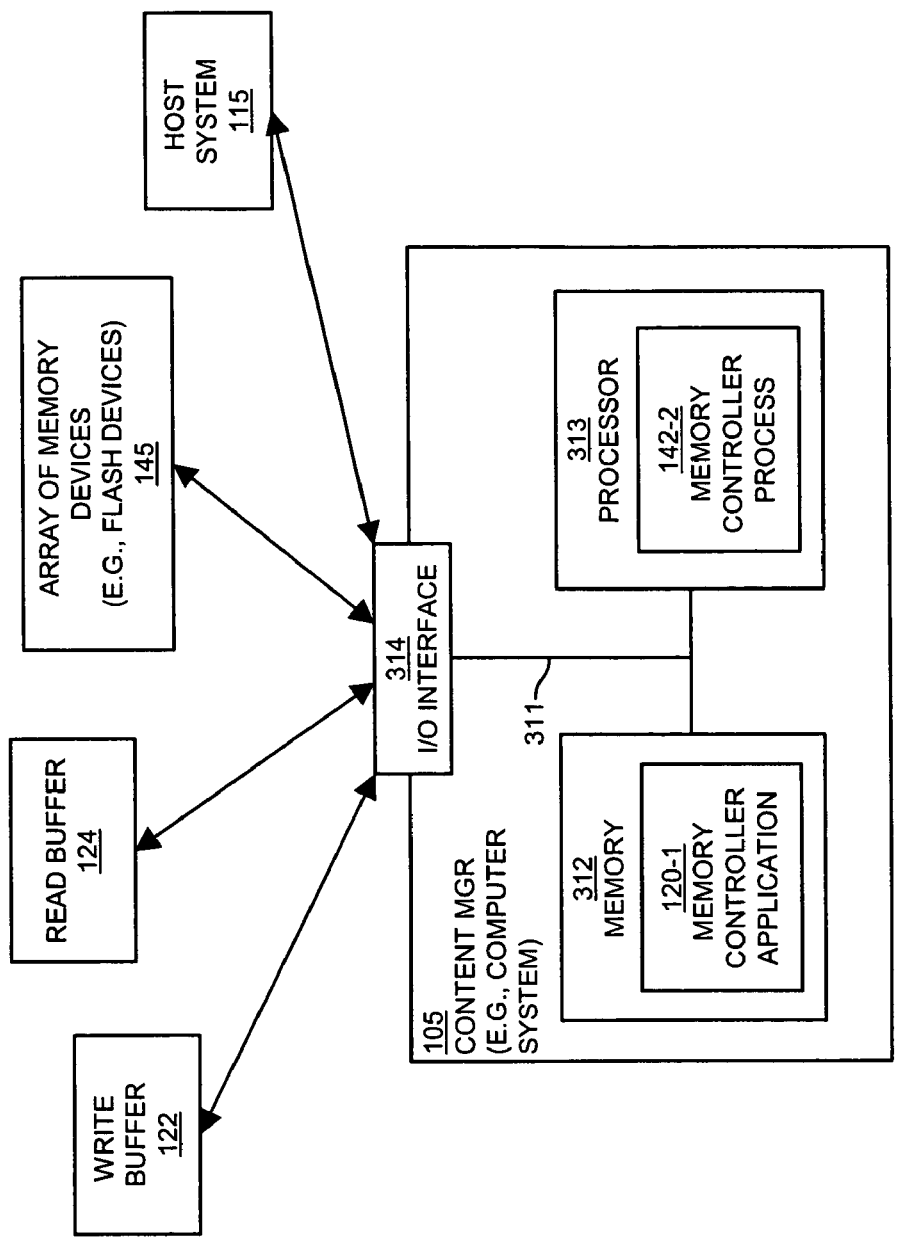
FIG. 4 is a diagram of an example architecture of a memory controller according to embodiments herein.

FIG. 4 is a diagram illustrating a sample architecture for implementing one or more processing functions (e.g., memory controller processing functions) according to embodiments herein. For example, as shown, content manager 105 can be implemented in a respective computer system including a processor 313 and corresponding software code (e.g., memory controller application 120-2) to carry out the embodiments discussed in this specification. As previously discussed, and as an alternative to an embodiment as shown in FIG. 4, the memory controller 120 and content manager 105 can be implemented via hardware components such as logic gates, buffers, etc. or combination of both types of suitable hardware and software resources.

As shown in FIG. 4, content manager 105 (e.g., computer system) of the present example includes an interconnect 311 that couples a memory system 312, a processor 313, an input/output interface 314. Input/output interface 314 enables content manager 105 to access and/or communicate with write buffer 122, memory devices 145, read buffer 124, and host system 115.

Memory system 312 is encoded with a memory controller application 120-1 supporting the functionality of coordinating transfers of data between write buffer 122 and memory devices 145, transfers of data between memory devices 145 and read buffer 124, and communicating with host system 115. Memory controller application 120-1 can be embodied as software code such as data and/or logic instructions (e.g., code stored in the memory or on another computer readable medium such as a disk) that supports processing functionality according to different embodiments described herein. During operation, processor 313 accesses memory system 312 via the interconnect 311 in order to launch, run, execute, interpret or otherwise perform the logic instructions of the memory controller application 120-1. Execution of memory controller application 120-1 produces processing functionality in memory controller process 120-2. In other words, the memory controller process 120-2 represents one or more portions of the memory controller as discussed above in FIG. 1.

It should be noted that the memory controller application 120-1 executed in computer system shown of FIG. 4 can be represented by either one or both of the memory controller application 120-1 and/or the memory controller process 120-2. For purposes of this discussion, general reference will be made to the memory controller 120 as performing or supporting the various steps and functional operations to carry out techniques discussed herein.

It should also be noted that example configurations herein include the memory controller application 120-1 itself (i.e., the un-executed or non-performing logic instructions and/or data). The memory controller application 120-1 may be stored on a computer readable medium (such as a floppy disk), hard disk, or optical medium. The memory controller application 120-1 may also be stored in a memory system 312 such as in firmware, read only memory (ROM), or, as in this example, as executable code in, for example, Random Access Memory (RAM). In addition to these embodiments, it should also be noted that other embodiments herein include the execution of memory controller application 120-1 in processor 313 as the memory controller process 120-2. Thus, those skilled in the art will understand that the data communication device may include other processes and/or software and hardware components to carry out functionality described herein.

Figure 5:
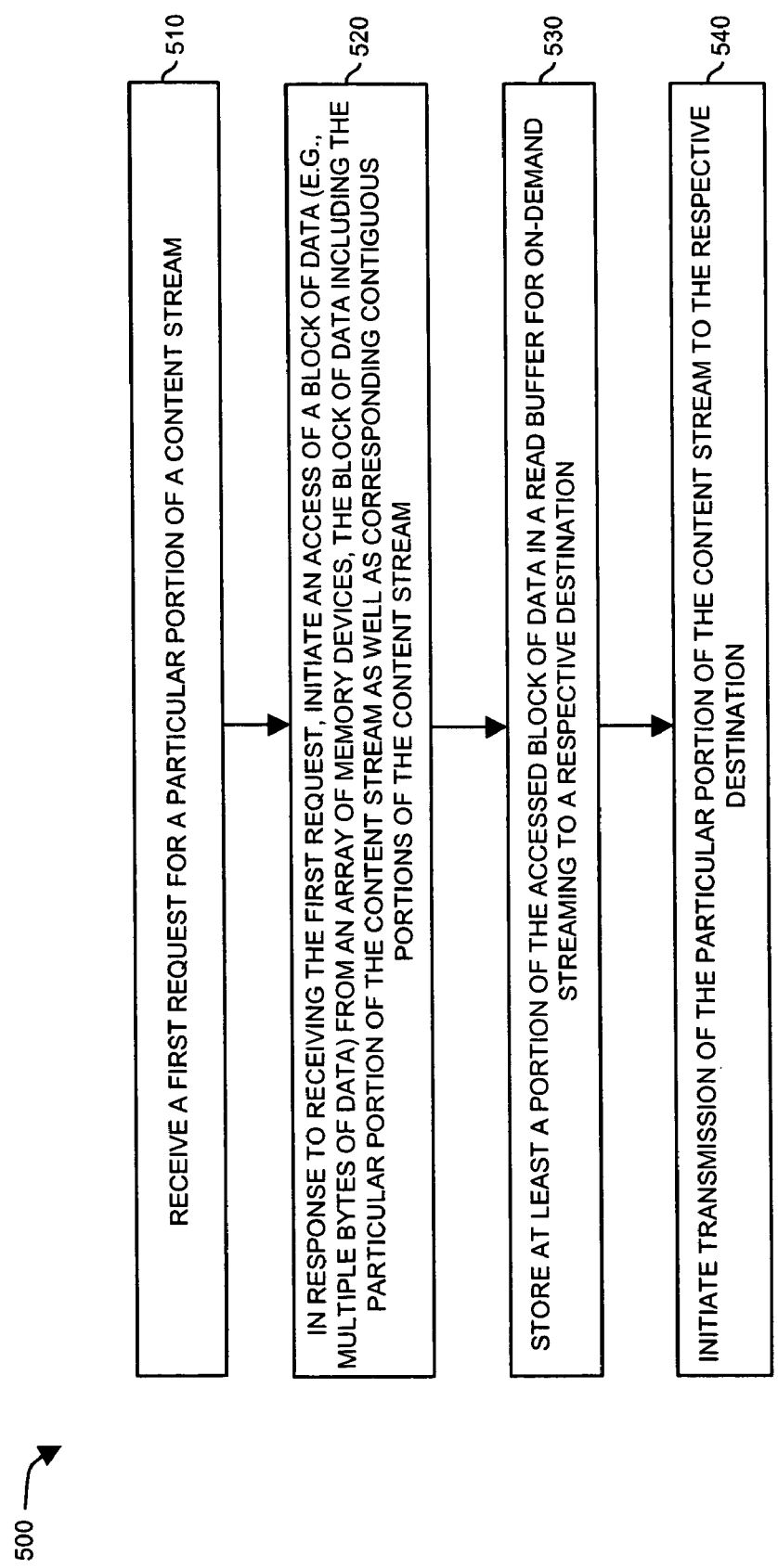
FIG. 5 is a flowchart illustrating a technique of buffering and distributing content according to an embodiment herein.

FIG. 5 is a flowchart 500 illustrating a technique of facilitating distribution of content using flash or other types of memory devices 145 according to embodiments herein. Note that FIG. 5 will be described with respect to the embodiments as discussed above with respect to FIGS. 1-4. Also, as mentioned above, note that memory controller 120 and related functionality can be implemented in hardware and/or software.

In step 510, the memory controller 120 receives a request for a particular portion of content stream such as content stream 202.

In step 520, in response to receiving the request, the memory controller 120 initiates an access of a block of data (e.g., multiple bytes of data) from memory devices 145 (e.g., an array of flash memory devices). The block of data accessed by the memory controller 120 can include the particular portion of the content stream 202 requested by the host system 115 as well as corresponding contiguous portions of the content stream. In other words, the host system 115 may request segment SEG100 of content stream 202 in memory devices 145. In response to the request, the memory controller 120 can initiate access of a block of data from the memory devices 145 including SEG100 through SEG150, even though host system 115 requests retrieval of only SEG100 for storage in read buffer 122 and future transmission over network 150 to a corresponding subscriber.

In step 530, the memory controller 120 stores all (e.g., SEG100 through SEG150) or a portion (e.g., 25% if the access happens to be truncated) of the accessed block of data (e.g., SEG100 through SEG112) in read buffer 124 for on-demand streaming to a respective destination such as a subscriber at user domain 190-1. In step 540, the memory controller 120 initiates transmission of the particular portion of the content stream as specified by the request through host system 115 to the respective subscriber destination.

Figure 6:
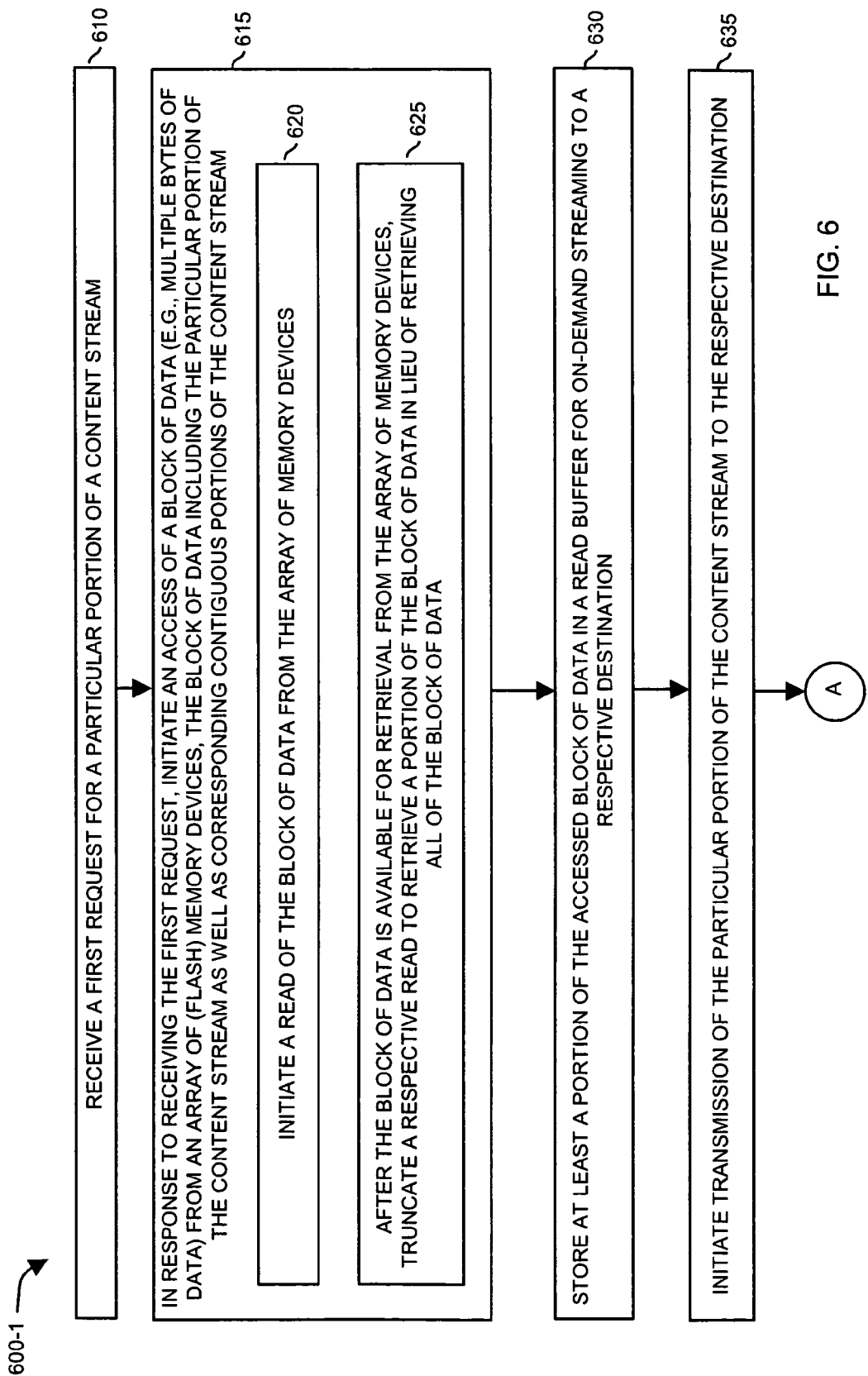
FIGS. 6 and 7 combine to form a flowchart illustrating more specific techniques of buffering and distribution content according to an embodiment herein.
Figure 7:
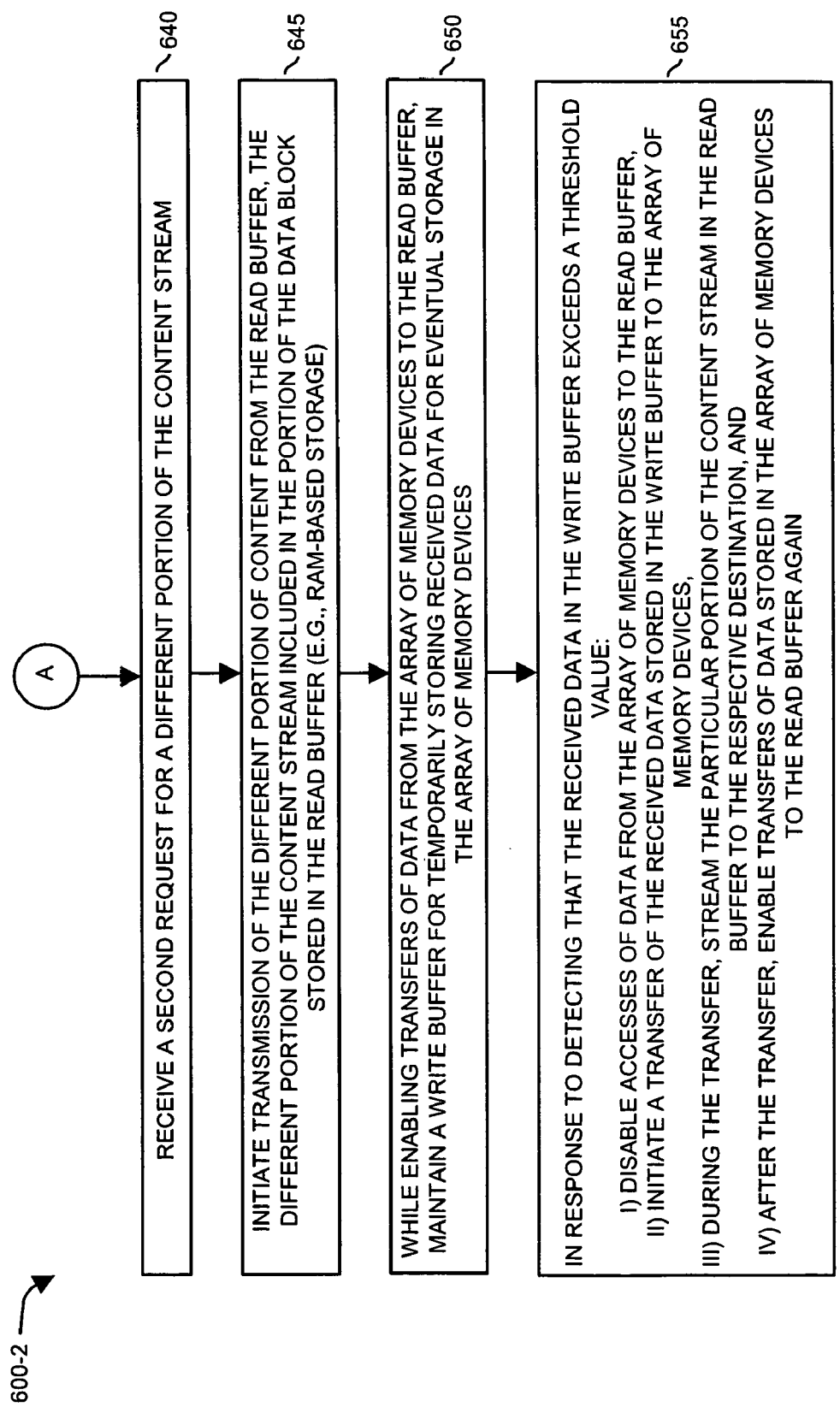

FIGS. 6 and 7 combine to form a flowchart 600 (e.g., flowchart 600-1 and flowchart 600-2) illustrating a technique of coordinating data transfers and data distribution according to embodiments herein.

In step 610 of flowchart 600-1 in FIG. 6, the memory controller 120 receives a request from the host system 115 for a particular portion of a content stream such as content stream 202 stored in memory devices 145. The request from host system 115 can occur in response to a subscriber sending a command to host system 115 to view the content stream. In one embodiment, the subscriber selects the content stream (e.g., movie) from a listing of content stored in memory devices 145.

In step 615, in response to receiving the first request, the memory controller 120 initiates an access of a block of data (e.g., multiple bytes of data) from (an array of flash-based) memory devices 145. The block of data being accessed includes the particular portion of the content stream requested by the memory controller 120 as well as corresponding contiguous portions of the content stream being forwarded from the host system 115 to be viewed by the subscriber.

In sub-step 620 associated with step 615, the memory controller 120 initiates a read of the block of data from the array of flash memory devices 145.

In sub-step 625 associated with step 615, after the block of data is available for retrieval from the memory devices 145, the memory controller truncates a respective read of data from the memory devices 145 to retrieve a portion of the block of data (e.g., 25% of the block of data) in lieu of retrieving all of the block of data from the memory devices 145. In other words, as mentioned above, the memory controller 120 can request a larger block of data from the memory devices than the memory controller 120 actually transfers into the read buffer 124. This may require an increased number of accesses to transfer data in the memory devices 145 to the read buffer 124. However, transferring and storing smaller portions of data in the read buffer 124 reduces the amount of RAM-based storage that must be used to implement the read buffer 124.

In step 630, the memory controller 120 stores at least a portion of the accessed block of data from memory devices 145 in read buffer 124 for on-demand streaming to a respective destination such as user domain 190.

In step 635, the memory controller 120 initiates transmission of the particular portion of the content stream as specified by the request through host system 115 to the respective subscriber destination.

In step 640, the memory controller 120 receives another request (e.g., a second request) for a different or another portion of the content stream 202.

In step 645, the memory controller 120 initiates transmission of the newly requested portion of the content from the read buffer to the host system 115. In this case, there is a cache hit (e.g., the read buffer 124 is the cache) because the read buffer 124 happens to currently store the content segment requested by the host system 115.

In step 650, while enabling transfer operations of moving data from the memory devices 145 to the read buffer 124 as discussed above, the memory controller 120 also maintains a write buffer 122 for temporarily storing received data for eventual storage in the array of memory devices 145.

In step 655, in response to detecting that the received data in the write buffer 122 exceeds a threshold value, the memory controller 120: i) disables accesses (transfers) of data from the array of memory devices 145 to the read buffer 124, ii) initiates a transfer of the received data (including or excluding the sets of navigation pointers) stored in the write buffer 124 to the array of memory devices 145, iii) during the transfer, enables streaming of one or more content streams from the read buffer 124 to the respective destinations so that the subscribers can view an uninterrupted movie, and iv) after the transfer, enables transfers of data stored in the array of memory devices 145 to the read buffer 124 again.

As discussed, techniques herein are well suited for use in applications such as distribution of content stored in flash-based memory devices. However, it should be noted that configurations herein are not limited to use in such applications and thus configurations herein and deviations thereof are well suited for other applications as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A method comprising:
   receiving a first request for a particular portion of a content stream;
   in response to receiving the first request, initiating an access of a block of data from an array of memory devices, the block of data including the particular portion of the content stream as well as corresponding contiguous portions of the content stream, wherein initiating the access of the block of data from the array of memory devices includes retrieving more data from the array of memory devices than as specified by the first request;
   storing at least a portion of the accessed block of data in a read buffer for on-demand streaming to a respective destination, wherein storing at least a portion of the block of data includes storing more data retrieved from the array of memory devices in the read buffer than as specified by the first request;
   initiating transmission of the particular portion of the content stream to the respective destination;
   receiving a second request for a different portion of the content stream; and
   initiating transmission of the different portion of content from the read buffer, the different portion of the content stream included in the portion of the data block stored in the read buffer.

2. A method as in claim 1, wherein initiating the access of the block of data from the array of memory devices includes:
   initiating a read of the block of data from the array of memory devices;
   after the block of data is available for retrieval from the array of memory devices, truncating a respective read to retrieve a portion of the block of data in lieu of retrieving all of the block of data; and
   storing the portion of the block of data in the read buffer.

3. A method as in claim 1, wherein initiating the access of the block of data from the array of memory devices includes:
   initiating a read of the data block from the array of memory devices;
   after the data block is available for retrieval from the array of memory devices, truncating the read to retrieve a portion of the block of data in lieu of retrieving all of the block of data; and
   storing the portion of the block of data in a region of the read buffer allocated for the on-demand streaming of the portion of the block of data to the respective destination.

4. A method as in claims 1 further comprising:
   while enabling transfers of data from the array of memory devices to the read buffer, maintaining a write buffer for temporarily storing received data for eventual storage in the array of memory devices; and
   in response to detecting that the received data exceeds a threshold value:
   i) disabling accesses of data from the array of memory devices to the read buffer,
   ii) initiating a transfer of the received data stored in the write buffer to the array of memory devices,
   iii) during the transfer, streaming the particular portion of the content stream in the read buffer to the respective destination, and
   iv) after the transfer, enabling transfers of data stored in the array of memory devices to the read buffer again.

5. A method as in claims 1 further comprising:
   in between enabling transfers of data from the array of memory devices to the read buffer, enabling a modification mode in which the data stored in the array of memory devices can be modified;
   receiving a new page of data to be stored at a respective location in the array of memory devices;
   retrieving a range of multiple pages including a current page stored at the location in the array of memory devices;
   replacing the current page in the retrieved range of multiple pages with the new page; and
   during the modification mode, initiating storage of the multiple pages including the new page to the array of memory devices such that the new page is stored at the respective location in the array of memory devices.

6. A method as in claim 5, wherein initiating storage of the multiple pages including the new page to the array of memory devices includes erasing the multiple pages including the current page from the array of memory devices.

7. A method as in claim 1, wherein initiating the access of the block of data includes accessing an array of flash memory devices supporting block accesses of multiple bytes of stored data.

8. A method as in claim 7, wherein storing at least a portion of the accessed block of data includes storing the portion of the accessed block of data to RAM-based (Random Access Memory-based) storage.

9. A method as in claim 8 further comprising:
maintaining the array of flash memory devices to store at least one logical grouping of video data capable of playback in a contiguous manner; and
allocating portions of the RAM-based storage to store different corresponding segments of the at least one logical grouping of video data for streaming to different respective destinations over a network; and
updating the portions of the RAM-based storage to respective new segments of at least one logical grouping of video data as the different corresponding segments are streamed to the respective destinations.

10. A computer system that supports selection and paste operations, the computer system comprising:
a processor;
a memory unit that stores instructions associated with an application executed by the processor; and
an interconnect coupling the processor and the memory unit, enabling the computer system to execute the application and perform operations of:
receiving a first request for a particular portion of a content stream;
in response to receiving the first request, initiating an access of a block of data from an array of memory devices, the block of data including the particular portion of the content stream as well as corresponding contiguous portions of the content stream, wherein initiating the access of the block of data from the array of memory devices includes retrieving more data from the array of memory devices than as specified by the first request;
storing at least a portion of the accessed block of data in a read buffer for on-demand streaming to a respective destination, wherein storing at least a portion of the block of data includes storing more data retrieved from the array of memory devices in the read buffer than as specified by the first request;
initiating transmission of the particular portion of the content stream to the respective destination;
receiving a second request for a different portion of the content stream; and
initiating transmission of the different portion of content from the read buffer, the different portion of the content stream included in the portion of the data block stored in the read buffer.

11. A computer system as in claim 10, wherein initiating the access of the block of data from the array of memory devices includes:
initiating a read of the block of data from the array of memory devices;
after the block of data is available for retrieval from the array of memory devices, truncating a respective read to retrieve a portion of the block of data in lieu of retrieving all of the block of data; and
storing the portion of the block of data in the read buffer.

12. A computer system as in claim 10, wherein initiating the access of the block of data from the array of memory devices includes:
initiating a read of the data block from the array of memory devices;
after the data block is available for retrieval from the array of memory devices, truncating the read to retrieve a portion of the block of data in lieu of retrieving all of the block of data; and
storing the portion of the block of data in a region of the read buffer allocated for the on-demand streaming of the portion of the block of data to the respective destination.

13. A computer system as in claim 10 further supporting operations of:
while enabling transfers of data from the array of memory devices to the read buffer, maintaining a write buffer for temporarily storing received data for eventual storage in the array of memory devices; and
in response to detecting that the received data exceeds a threshold value:
i) disabling accesses of data from the array of memory devices to the read buffer,
ii) initiating a transfer of the received data stored in the write buffer to the array of memory devices,
iii) during the transfer, streaming the particular portion of the content stream in the read buffer to the respective destination, and
iv) after the transfer, enabling transfers of data stored in the array of memory devices to the read buffer again.

14. A computer system as in claim 10 further supporting operations of:
in between enabling transfers of data from the array of memory devices to the read buffer, enabling a modification mode in which the data stored in the array of memory devices can be modified;
receiving a new page of data to be stored at a respective location in the array of memory devices;
retrieving a range of multiple pages including a current page stored at the location in the array of memory devices;
replacing the current page in the retrieved range of multiple pages with the new page; and
during the modification mode, initiating storage of the multiple pages including the new page to the array of memory devices such that the new page is stored at the respective location in the array of memory devices.

15. A computer system as in claim 14, wherein initiating storage of the multiple pages including the new page to the array of memory devices includes erasing the multiple pages including the current page from the array of memory devices.

16. A computer system as in claim 10, wherein initiating the access of the block of data includes accessing an array of flash memory devices supporting block accesses of multiple bytes of stored data.

17. A computer system as in claim 16, wherein storing at least a portion of the accessed block of data includes storing the portion of the accessed block of data to RAM-based (Random Access Memory-based) storage.

18. A computer system as in claim 17 further supporting operations of:
maintaining the array of flash memory devices to store at least one logical grouping of video data capable of playback in a contiguous manner; and allocating portions of the RAM-based storage to store different corresponding segments of the at least one logical grouping of video data for streaming to different respective destinations over a network; and updating the portions of the RAM-based storage to respective new segments of at least one logical grouping of video data as the different corresponding segments are streamed to the respective destinations.

19. A system comprising:

means for receiving a request for a particular portion of a content stream;

means for initiating an access of a block of data from an array of memory devices in response to receiving the request, the block of data including the particular portion of the content stream as well as corresponding contiguous portions of the content stream, wherein initiating the access of the block of data from the array of memory devices includes retrieving more data from the array of memory devices than as specified by the first request;

means for storing at least a portion of the accessed block of data in a read buffer for on-demand streaming to a respective destination, wherein storing at least a portion of the block of data includes storing more data retrieved from the array of memory devices in the read buffer than as specified by the first request; and means for initiating transmission of the particular portion of the content stream to the respective destination;

means for receiving a second request for a different portion of the content stream; and means for initiating transmission of the different portion of content from the read buffer, the different portion of the content stream included in the portion of the data block stored in the read buffer.

* * * * *